United States Patent [19]

Yoshida

[11] 4,256,174
[45] Mar. 17, 1981

[54] APPARATUS FOR HEATING AND COOLING SAND

[75] Inventor: Etuji Yoshida, Wakayama, Japan
[73] Assignee: Kao Soap Co., Ltd., Tokyo, Japan
[21] Appl. No.: 896,793
[22] Filed: Apr. 17, 1978

Related U.S. Application Data

[63] Continuation of Ser. No. 692,192, Jun. 2, 1976, abandoned.

[30] Foreign Application Priority Data

Jun. 2, 1975 [JP] Japan ................................ 50-74587

[51] Int. Cl.³ .............................................. F28F 3/14
[52] U.S. Cl. ........................... 165/DIG. 27; 193/2 R; 34/167; 34/174; 422/143; 422/146
[58] Field of Search ......................... 165/106, 104 M; 406/122; 34/57 A, 174; 122/40; 422/143, 6

[56] References Cited

U.S. PATENT DOCUMENTS

| 2,509,014 | 5/1950 | Payne et al. | 34/174 X |
| 2,611,685 | 9/1952 | Yoder | 34/57 A X |
| 2,839,338 | 6/1958 | Arnold | 406/122 |
| 3,514,868 | 6/1970 | Hoggarth | 34/57 A |

Primary Examiner—Samuel Scott
Assistant Examiner—Theophil W. Streule, Jr.
Attorney, Agent, or Firm—Blanchard, Flynn, Thiel, Boutell & Tanis

[57] ABSTRACT

An apparatus for heating or cooling sand comprising a heat exchange section provided in a lower portion thereof with flow regulating means consisting of a pyramidal or conical funnel assembly for causing flow of sand in the heat exchange section over the entire sectional area thereof.

6 Claims, 6 Drawing Figures

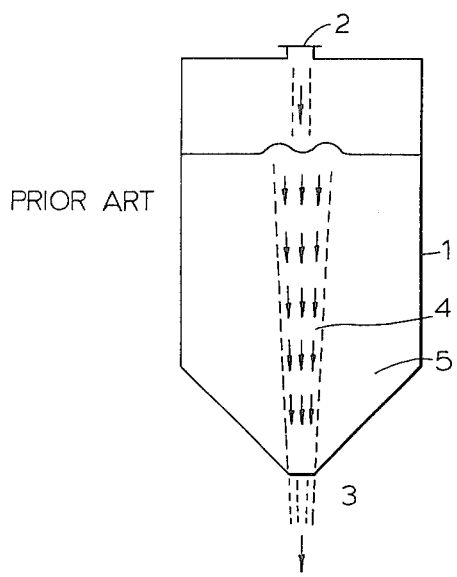
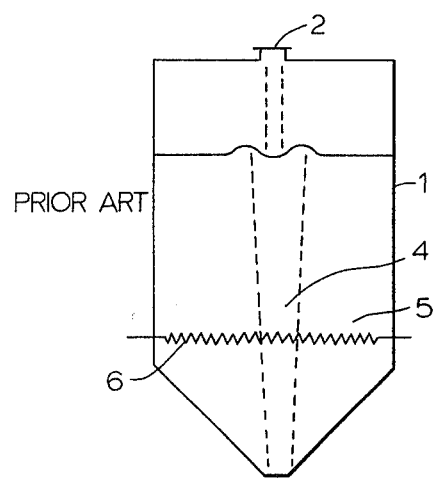
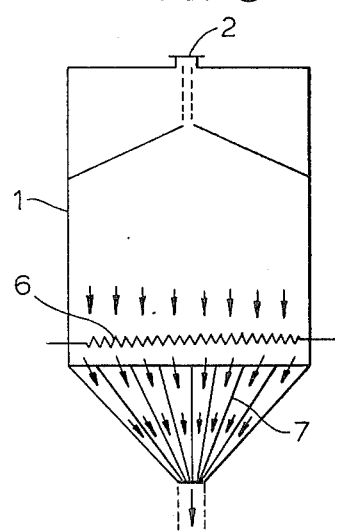

APPARATUS FOR HEATING AND COOLING SAND

This is a continuation of application Ser. No. 692,192 filed June 2, 1976, now abandoned.

BACKGROUND OF THE INVENTION

FIELD OF THE INVENTION

This invention relates to an apparatus for uniformly heating or cooling sand.

More specifically, the invention provides an apparatus for heating or cooling sand comprising a heat exchange section provided in a lower portion thereof with flow regulating means consisting of a pyramidal or conical funnel assembly for causing flow of sand in the heat exchange section over the entire sectional area thereof.

Unlike a liquid, when sand contained in a container is discharged through an outlet provided at the bottom of the container, the sand does not uniformly descend over the entire cross-sectional area of the container but rather, only the sand directly above the outlet falls downwardly, and the rest of sand remains more or less stationary in the container. Regarding this type of movement of sand, there are various descriptions in the literature; for instance, a disclosure about this is contained at page 373 of "Apparatus for Transporting Powdery and Granular Materials" by Takeshi Karino.

BRIEF DESCRIPTION OF THE DRAWINGS

FIG. 1 is a schematic vertical sectional view of a conventional container for sand showing the condition of movement of the sand therein when the sand is supplied to the top thereof and is discharged from the bottom thereof;

FIG. 2 is a schematic vertical sectional view of a conventional container for sand showing the flow state when heat exchange means is provided within the conventional container;

FIG. 3 is a schematic vertical sectional view showing the movement of sand when a flowing regulating means according to the invention is provided within the container;

Referring to the drawings, FIG. 1 shows the condition of movement of sand within an ordinary container. As sand continuously enters the container 1 through an inlet 2, it is discharged through an outlet 3. In this case, substantially only the portion of sand directly above the outlet 3 moves downwardly and the rest 5 of sand within the container substantially remains stationary therein.

If heat exchange means 6 is provided for heating or cooling sand as shown in FIG. 2, only the portion thereof that is in heat exchange contact with the central, moving portion 4 of the sand effectively achieves heat exchange with the sand that is discharged. The remainder of the heat exchange means exchanges heat with the stationary portion 5 of the sand. Thus, the entirety of the heat exchange means is not effective to achieve heat exchange with the sand that is discharged from the container.

Figure 4A:
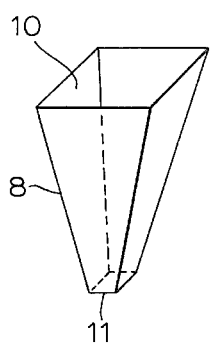
FIGS. 4A and 4B are perspective views of pyramidal funnels constituting embodiments of the flow regulating means according to the invention.
Figure 4B:
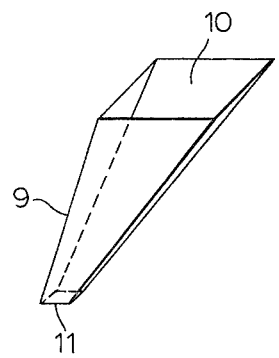
Figure 5:
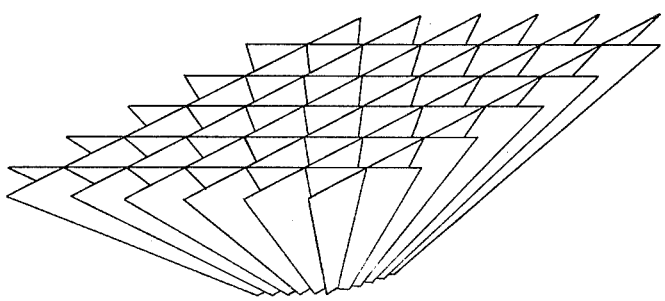
FIG. 5 is a perspective view showing a pyramidal funnel assembly made of plates.
Figure 6:
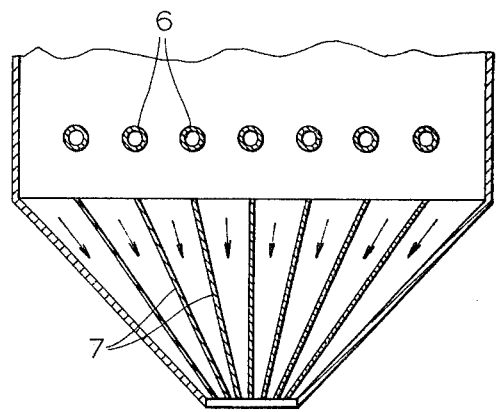

The invention is intended to avoid such non-uniform heating or cooling and, instead, to achieve effective heating or cooling of the sand that is discharged from the container uniformly over the entire area of the heat exchange means. More particularly, according to the invention, a flow regulating means 7 consisting of a frusto-pyramidal or frusto-conical funnel assembly is provided in the bottom portion of the container 1, as shown in FIG. 3. This flow regulating means 7 divides the cross-sectional area of the container into a plurality of divisions or sections, permitting descent of sand in each section. Thus, sand within the container 1 can move downwardly over the entire cross-sectional area of the container to permit effective heat exchange over the entire area of the heat exchange means 6. The heat exchange means 6 preferably consists of heating or cooling pipes arranged within the container, but it may have any other suitable form as well. The flow regulating means 7 can consist of an assembly or module of inverted frusto-pyramidal funnels 8 or 9 as shown in FIGS. 4A and 4B. These funnels more or less differ in shape from right frusto-pyramidal (FIG. 4A) to oblique frusto-pyramidal (FIG. 4B) depending upon their positions in the assembly. Sand entering each funnel from its inlet opening 10 is discharged from its outlet opening 11 and thence through the common outlet of the container. While the funnels illustrated in FIGS. 4A and 4B have a quadrangular section, it is also possible to adopt triangular, hexagonal or any other suitable cross-sectional shape, and part of the funnel can be conical. In assembly, individual funnels can be produced and assembled together or, alternatively, plates as shown in FIG. 5 can be assembled to form the funnel assembly. As the area of inlet opening 10 of the individual funnels is made smaller, the flow of the sand becomes more uniform, but too small an area of the outlet opening 11 is likely to give rise to clogging. In the case of sand of 10 to 100 mesh size, the area of the funnel inlet opening 10 is preferably between 50 and 500 cm$^2$.

The heat exchange of sand, cooling or heating, preferably requires employment of a medium having a temperature higher or lower by 5° to 10° C. than the temperature of the sand.

The embodiments of the invention in which an exclusive property or privilege is claimed are defined as follows:

1. An apparatus, especially for heating or cooling sand, of the kind including:
    a vertically elongated container having a downwardly tapered bottom wall defining a convergent discharge funnel having a downwardly opening outlet at its lower end for discharging the contents of said container;
    heat exchange means disposed in said container above the wide upper end of said discharge funnel for heat exchange contact with the contents of the container substantially across the cross-section of the container; and wherein the improvement comprises
    a flow-regulating assembly positioned in said convergent discharge funnel below said heat exchange means for causing the contents of said container to move downwardly over the entire cross-section of the container for effective heat exchange over the entire area of the heat exchange means, said flow-regulating assembly extending from adjacent the wide upper end of said discharge funnel to adjacent the narrow lower end thereof, said flow-regulating assembly filling substantially the entire cross-section of said convergent discharge funnel and having wall means dividing said convergent discharge funnel into a multitude of inverted elongated frusto-pyramidal or frusto-conical passages arranged side-by-side contiguous relation across the entire cross-section of said discharge funnel, the wide upper ends of said passages opening upwardly and respectively communicating with laterally adjacent portions of said container substantially at or above the upper end of said discharge funnel so that the contents of said container across substantially the entire cross-sectional area of the container above said discharge funnel can be received in the respective passages, the longitudinal central axes of said passages being inclined with respect to the vertical and converging with respect to each other in a direction toward said narrow funnel outlet, such that said frusto-conical or frusto-pyramidal shapes of said passages progressively further from the longitudinal central axis of said discharge funnel are progressively more skewed, the narrow lower ends of said passages being located close to, substantially vertically directly above and opening to said narrow funnel outlet so that the contents of said container flow by gravity to said narrow funnel outlet through each of said passages.

2. An apparatus as claimed in claim 1, in which said upper and lower ends of said passages, respectively, are substantially coplanar.

3. An apparatus as claimed in claim 2 in which said flow-regulating assembly consists of a plurality of vertical plates crossing each other at right angles to define quadrangular passages with the outer edges of said plates being tapered to conform to the taper of said bottom wall.

4. An apparatus as claimed in claim 1 in which said heat exchange means is an shaped so that portions thereof overlie the upper ends of substantially all of said passages.

5. An apparatus as claimed in claim 1 in which said passages are frusto-pyramidal passages.

6. An apparatus as claimed in claim 5 in which said passages have rectangular cross-sections, said passages being defined by a first series of planar spaced-apart plates which define two opposing sides of said passages and a second series of planar spaced-apart plates which extend at right angles to said first series of plates and define the other two opposing sides of said passages, said first plates and said second plates progressively further from the vertical central axis of said funnel being progressively more inclined to said funnel axis.

* * * * *

UNITED STATES PATENT OFFICE
CERTIFICATE OF CORRECTION

Patent No. 4 256 174          Dated March 17, 1981

Inventor(s) Etuji Yoshida

It is certified that error appears in the above-identified patent and that said Letters Patent are hereby corrected as shown below:

Column 3, line 5;  after "arranged" insert ---in---.
    Column 5, line 13;  delete "an".

Signed and Sealed this

Sixteenth Day of June 1981

[SEAL]

*Attest:*

RENE D. TEGTMEYER

*Attesting Officer*     *Acting Commissioner of Patents and Trademarks*